United States Patent [19]

Kawai et al.

[11] 4,314,039
[45] Feb. 2, 1982

[54] POLYPROPYLENE COMPOSITION CONTAINING A 1.3,2.4-DI(ALKYLBENZYLIDENE) SORBITOL

[75] Inventors: Yoichi Kawai; Katsuyoshi Sasagawa, both of Yokohama; Masami Maki, Kawasaki; Hozumi Ueda; Masayoshi Miyamoto, both of Kamakura, all of Japan

[73] Assignee: Mitsui Toatsu Chemicals, Inc., Tokyo, Japan

[21] Appl. No.: 175,726

[22] Filed: Aug. 6, 1980

[30] Foreign Application Priority Data

Aug. 21, 1979 [JP] Japan .................... 54/105523

[51] Int. Cl.$^3$ ................................. C08K 5/06
[52] U.S. Cl. ........................ 525/1; 260/30.4 R
[58] Field of Search ............. 525/1; 260/45.95 R, 260/45.8 A, 30.4 R

[56] References Cited

U.S. PATENT DOCUMENTS 3,767,729 10/1973 Muyai et al. .................... 525/1

FOREIGN PATENT DOCUMENTS

| | | | |
|---|---|---|---|
| 49-20378 | 5/1974 | Japan | 525/1 |
| 51-22740 | 2/1976 | Japan | 525/1 |
| 52-69950 | 6/1977 | Japan | 525/1 |
| 53-117044 | 10/1978 | Japan | 525/1 |

*Primary Examiner*—Paul R. Michl
*Attorney, Agent, or Firm*—Fisher, Christen & Sabol

[57] ABSTRACT

A composition having improved transparency and being substantially free from a bleeding phenomenon comprising 100 parts by weight of polypropylene and 0.005 to 8 parts by weight of a 1.3,2.4-di(alkylbenzylidene) sorbitol with each alkyl group having 2 to 18 carbon atoms.

8 Claims, No Drawings

POLYPROPYLENE COMPOSITION CONTAINING A 1.3,2.4-DI(ALKYLBENZYLIDENE) SORBITOL

FIELD OF THE INVENTION

This invention relates to a polypropylene composition for obtaining molded articles having improved transparency and being substantially free from bleeding of additives.

DESCRIPTION OF THE PRIOR ART

Polypropylene is used in large quantities as a principal raw material of the plastics industry in various applications such as containers for miscellaneous articles of commerce, packaging materials (e.g., films), and industrial component parts because of its excellent mechanical, thermal, chemical and electrical properties. However, because polypropylene has high crystallinity and therefore gives molded articles of poor transparency, it has been strongly desired to develop polypropylene having improved transparency.

Use of various additives is known as a method for improving the transparency of polypropylene. For example, Japanese Laid-Open Patent Publication No. 22740/76 discloses the addition of dibenzylidene sorbitol. This method, however, has the defect that the improvement of transparency is still insufficient and bleeding of additives occurs during molding. As a method for reducing this bleeding phenomenon, Japanese Laid-Open Patent Publication No. 117044/78 suggests the addition of 1.3,2.4-di(methylbenzylidene) sorbitol. However, the polypropylene composition provided by this method is still defective in bleeding although its transparency shows a considerable improvement.

SUMMARY OF THE INVENTION

An object of this invention is to provide a polypropylene composition useful for production of molded articles having excellent transparency.

Another object of this invention is to provide a polypropylene composition substantially free from bleeding of additives which is frequently noted in conventional compositions of this kind.

The above objects of this invention are achieved in accordance with this invention by adding 0.005 to 8 parts by weight, preferably 0.1 to 0.3 part by weight, of a 1.3,2.4-di(alkylbenzylidene) sorbitol with each alkyl group having 2 to 18 carbon atoms to 100 parts by weight of polypropylene.

DETAILED DESCRIPTION OF EMBODIMENTS OF THE INVENTION

According to this invention, 0.005 to 8 parts by weight of a 1 3,2 4-di(alkylbenzylidene) sorbitol of the general formula

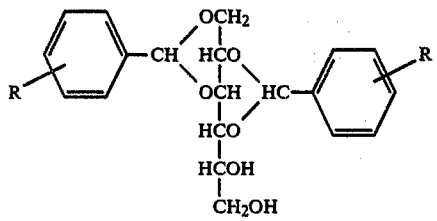

wherein R represents an alkyl group having 2 to 18 carbon atoms, is added to 100 parts by weight of polypropylene. If the amount of the substituted dibenzylidene sorbitol is less than 0.005 part by weight, the transparency of the polypropylene cannot be sufficiently improved, and if it exceeds 8 parts by weight, a bleeding phenomenon occurs. Hence, amounts outside the specified range are undesirable.

The suitable amount of the substituted dibenzylidene sorbitol slightly varies depending upon the number of carbon atoms of the alkyl group, etc. For example, a 1.3,2.4-di(alkylbenzylidene) sorbitol having 2 to 8, preferably 2 to 4, carbon atoms in each alkyl group is used in an amount of 0.05 to 1 part by weight. The suitable amount of 1.3,2.4-di(ethylbenzylidene) sorbitol is 0.01 to 8 parts by weight, preferably 0.05 to 1 part, and more preferably, as is clear from the Examples given hereinbelow, 0.1 to 0.3 parts by weight.

Polypropylene, as used in the present invention, denotes not only isotactic polypropylene, but also crystalline copolymers of propylene and ethylene or propylene and α-olefins and mixtures thereof.

A molded article having equivalent transparency to that obtained from a conventional composition can be prepared from the composition of this invention containing the additive in an amount ½ to ⅓ of that in the conventional composition. The additive used in this invention does not appreciably bleed even when it is added in the same amount as the conventional additive. Since its amount can be reduced as described above in order to obtain haziness required for practical application, substantially no bleeding occurs during molding of the composition of this invention. While the use of the known dibenzylidene sorbitol and 1.3,2.4-di(methylbenzylidene) sorbitol in a propylene homopolymer cannot be expected to produce an effect of improving its transparency, the use of the substituted dibenzylidene sorbitol having specified alkyl substituents makes it possible to increase greatly the effect of rendering the propylene homopolymer transparent. This effect cannot be expected from the prior art.

Each alkyl group in the 1.3,2.4-di(alkylbenzylidene) sorbitol used in this invention has 2 to 18 carbon atoms, preferably 2 to 8 carbon atoms, more preferably 2 to 4 carbon atoms. Examples of preferred additive compounds include 1.3,2.4-di(ethylbenzylidene) sorbitol, 1.3,2.4-di(propylbenzylidene) sorbitol, 1.3,2.4-di(butylbenzylidene) sorbitol, 1.3,2.4-di(hexylbenzylidene) sorbitol, and 1.3,2.4-di(octylbenzylidene) sorbitol. Depending upon the position of the substituent R in the above general formula, these compounds include ortho-, meta- and para- isomers all of which can be used in this invention. There is scarcely any difference in performance among the 1.3,2.4-di(alkylbenzylidene) sorbitol isomers. In practical application, the readily available para-isomers are preferred.

Use of an antioxidant together with the sorbitol is preferred for improving the mechanical strength of molded articles prepared from the composition of this invention. In addition to the antioxidant, an HCl catcher such as a calcium or aluminum salt of a fatty acid, an ultraviolet absorber, and other stabilizers may also be used together.

The composition of this invention can be prepared by uniformly dispersing the sorbitol and optionally, an antioxidant and other additives in polypropylene by known means, for example by using a Henschel mixer. Pellets of the composition, which are an especially convenient form for use, can be obtained by mixing polypropylene powder with these additives, and pelletizing the mixture by melt-extruding it through an extruder, for example.

The following Synthesis Examples and Examples illustrate the present invention more specifically.

SYSTHESIS EXAMPLE

A 2-liter four-necked flask equipped with a paddle-shaped stirrer capable of performing good stirring, a thermometer and a liquid-liquid separator having a reflux condenser at its top portion was charged with 38.2 g (0.21 mole) of sorbitol, 53.7 g (0.40 mole) of p-ethylbenzaldehyde, 720 ml of benzene and 0.38 g of p-toluenesulfonic acid. With vigorous stirring, these materials were heated over a hot water bath until benzene was refluxed. The reaction was continued for 8 hours, and the resulting water was collected by the liquid-liquid separator. Then, benzene was distilled off. One liter of isopropanol was added, and the mixture was heated until isopropanol was refluxed, followed by maintaining the reaction mixture for 1 hour. The product was cooled, filtered, air-dried and then dried in a desiccator to give 71 g of white crystals.

Elemental analysis values: C 69.63 wt.%, H 7.24 wt.% [Calculated as 1.3,2 4-di(ethylbenzylidene) sorbitol $C_{24}H_{30}O_6$: C 69.54 wt.%, H 7.29 wt.%]

SYNTHESIS EXAMPLE 2

The same reaction as in Systhesis Example 1 was carried out using 59.2 g (0.04 mole) of p-propylbenzaldehyde instead of p-ethylbenzaldehyde and 720 ml of toluene instead of benzene. After distilling off the toluene, a mixture of methanol and water (1:1) was added to disperse the solid. The product was then filtered, air-dried, and then dried in a desiccator to give 50 g of a slightly yellow solid.

Elemental analysis values: C 71.3 wt.%, H 7.81 wt.% [Calculated as 1.3,2.4-di(propylbenzylidene) sorbitol $C_{24}H_{34}O_6$: C 70.56 wt.%, H 7.74 wt.%]

SYNTHESIS EXAMPLE 3

The same reaction as in Synthesis Example 1 was carried out using 64.1 g (0.40 mole) of n-butylbenzaldehyde instead of p-ethylbenzaldehyde and 720 ml of toluene instead of benzene. Then, the toluene was distilled off and a 1:1 mixture of methanol and water was added to disperse the solid. The product was filtered, air-dried and then dried in a desiccator to give 63 g of a white solid.

Elemental analysis values: C 72.1 wt.%, H 8.22 wt.% [Calculated as 1.3,2.4-di(butylbenzylidene) sorbitol $C_{28}H_{38}O_6$: C 71.46 wt.%, H 8.14 wt.%)

EXAMPLE 1

One hundred parts by weight of propylene homopolymer having an intrinsic viscosity, measured in tetralin at 135° C., of 1.62, 0.1 part by weight of tetrakis[methylene-3(3',5'-tert-butyl-4'-hydroxyphenyl)propionate]methane and 0.1 to 0.3 part by weight of each of the sorbitol derivatives obtained in Systhesis Examples 1 to 3 were mixed in a Henschel mixer. The mixture was pelletized by passing it through an extruder kept at a maximum temperature of 200° C. The pellets were then molded by an injection molding machine kept at a maximum temperature of 210° C. to form a sheet having a thickness of 2 mm. By the method of ASTM D-1003, the haziness of the sheet was measured by a hazemeter (model TC-H2, made by Tokyo Denshoku K.K. Japan), and bleeding of the additive on the mold surface during the injection molding was also observed.

The results are shown in Table 1.

It is seen from the results shown in Table 1 that the compositions of this invention containing the sorbitol derivatives specified in this invention had much better transparency than a composition not containing the sorbitol derivative and comparative compositions containing dibenzylidene sorbitol and 1.3,2.4-di(meta-methylbenzylidene) sorbitol respectively on the same quantity level, and moreover, showed no bleeding phenomenon.

TABLE 1

|  | Additive | Amount (parts by weight) | Haziness (%) | Bleeding (*) |
|---|---|---|---|---|
| Invention | 1 . 3,2 . 4-di(para-ethyl-benzylidene) sorbitol | 0.1 | 58 | 0 |
|  |  | 0.2 | 42 | 0 |
|  |  | 0.3 | 32 | 0 |
|  | 1 . 3,2 . 4-di(para-propyl-benzylidene) sorbitol | 0.1 | 59 | 0 |
|  |  | 0.2 | 44 | 0 |
|  |  | 0.3 | 33 | 0 |
|  | 1 . 3,2 . 4-di(para-butyl-benzylidene) sorbitol | 0.1 | 60 | 0 |
|  |  | 0.2 | 41 | 0 |
|  |  | 0.3 | 34 | 0 |
| Comparison | None | — | 88 | 0 |
|  | Dibenzylidene sorbitol | 0.1 | 70 | 1 |
|  |  | 0.2 | 62 | 2 |
|  |  | 0.3 | 54 | 3 |
|  | 1 . 3,2 . 4-di(meta-methyl-benzylidene) sorbitol | 0.1 | 62 | 0 |
|  |  | 0.2 | 50 | 1 |
|  |  | 0.3 | 45 | 1 |

(*) Bleeding was rated on the following scale.
0: No bleeding
1: Slight bleeding
2: Medium bleeding
3: Considerable bleeding

EXAMPLE 2

The procedure of Example 1 was repeated except that an ethylene-propylene random copolymer having an ethylene content of 3.3% by weight and an intrinsic viscosity, measured in tetralin at 135° C., of 1.62 was used instead of the propylene homopolymer. The results of the measurement of haziness and the observation of bleeding are shown in Table 2.

It is seen from the results shown in Table 2 that the compositions of this invention containing the sorbitol derivatives specified in this invention had much better transparency than a composition not containing the sorbitol derivative and comparative compositions containing dibenzylidene sorbitol and 1.3,2.4-di(meta-methylbenzylidene) sorbitol respectively on the same quantity level, and moreover, showed no bleeding phenomenon.

TABLE 2

|  | Additive | Amount (parts by weight) | Haziness (%) | Bleeding (*) |
|---|---|---|---|---|
| Invention | 1 . 3,2 . 4-di(para-ethyl-benzylidene) sorbitol | 0.1 | 25 | 0 |
|  |  | 0.2 | 17 | 0 |
|  |  | 0.3 | 14 | 0 |
|  | 1 . 3,2 . 4-di(para-propyl-benzylidene) sorbitol | 0.1 | 27 | 0 |
|  |  | 0.2 | 19 | 0 |
|  |  | 0.3 | 14 | 0 |
|  | 1 . 3,2 . 4-di(para-butyl-benzylidene) sorbitol | 0.1 | 29 | 0 |
|  |  | 0.2 | 19 | 0 |
|  |  | 0.3 | 16 | 0 |
| Comparison | None | — | 75 | 0 |
|  | Dibenzylidene sorbitol | 0.1 | 56 | 1 |

TABLE 2-continued

| Additive | Amount (parts by weight) | Haziness (%) | Bleeding (*) |
|---|---|---|---|
| | 0.2 | 25 | 2 |
| | 0.3 | 20 | 3 |
| 1.3,2.4-di(meta-methyl-benzylidene) sorbitol | 0.1 | 40 | 0 |
| | 0.2 | 23 | 1 |
| | 0.3 | 19 | 1 |

(*) The same as the footnote to Table 1.

What is claimed is:

1. A composition comprising 100 parts by weight of isotactic polypropylene or crystalline copolymers of propylene and ethylene or propylene and alpha-olefins or mixtures thereof and 0.005 to 8 parts by weight of a 1.3,2.4-di(alkylbenzylidene) sorbitol of the formula

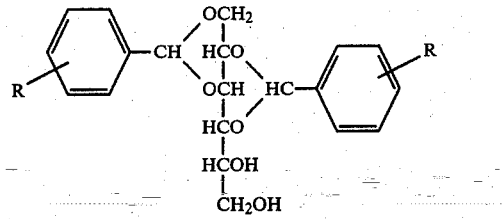

wherein R represents an alkyl group having 2 to 18 carbon atoms.

2. The composition of claim 1 wherein the alkyl group R has 2 to 8 carbon atoms.

3. The composition of claim 2 wherein the alkyl group R has 2 to 4 carbon atoms.

4. The composition of claim 2 or 3 wherein the amount of the 1.3,2.4-di(alkylbenzylidene) sorbitol is 0.05 to 1 part by weight.

5. The composition of claim 1 comprising a crystalline copolymer of propylene and an α-olefin.

6. The composition of claim 1 comprising a crystalline copolymer of propylene and ethylene.

7. The composition of claim 1 comprising a homopolymer of propylene.

8. The composition of claim 1 further including an antioxidant, and wherein said composition is in pellet form.

* * * * *